United States Patent [19]

Self

[11] Patent Number: 5,092,162
[45] Date of Patent: Mar. 3, 1992

[54] STATIC PRESSURE TESTING APPARATUS

[76] Inventor: Fred Self, 933 Parkside Dr., Richmond, Calif. 94803

[21] Appl. No.: 578,765

[22] Filed: Sep. 7, 1990

Related U.S. Application Data

[63] Continuation of Ser. No. 361,316, Jun. 5, 1989, abandoned.

[51] Int. Cl.$^5$ .............................................. G01M 3/28
[52] U.S. Cl. ................................................... 73/49.5
[58] Field of Search ....................... 73/49.5, 40.5 R, 40

[56] References Cited

U.S. PATENT DOCUMENTS 4,167,868 9/1979 Bobo et al. .............................. 73/49.5
4,599,890 7/1986 Girone et al. ...................... 73/49.5 X Primary Examiner—Hezron E. Williams
Attorney, Agent, or Firm—Bielen, Peterson & Lampe

[57] ABSTRACT

A pressure testing apparatus for a fire hose utilizing a source of water under relatively low pressure and flowable at relatively high volumetric rate. The apparatus employs a manifold using a hose filling valve. The source of water communicates with the manifold and a low pressure inlet of a pump. The outlet of a pump pressurizes the manifold at a relatively high pressure. Check valves prevent back flow from the manifold to the source of water and the outlet of the pump. A regulator valve is positioned in the manifold to determine the highest pressure found in a portion of the manifold for filling and testing the fire hose.

6 Claims, 3 Drawing Sheets

STATIC PRESSURE TESTING APPARATUS

This is a continuation of application Ser. No. 361,316 filed Jun. 5, 1989, now abandoned.

BACKGROUND OF THE INVENTION

The present invention relates to a novel pressure testing apparatus for one or more fire hoses.

Fire hoses used on fire engines must constantly be tested to obviate breakage while fighting an actual fire. A broken fire hose is not only a very dangerous occurrence for the fire fighting personnel, but, often, seriously hampers efforts in extinguishing a fire.

Prior methods of testing fire hoses have included the usage of a pumper truck, which is an important piece of fire equipment. Unfortunately such constant testing of the fire hoses often places excessive wear on a pumper truck resulting in break down of the same. In addition, a pumper truck being employed for testing hoses is not readily available for fighting fires at or about the same time.

Simply connecting a fire hose to a fire hydrant does not create enough pressure to provide a true test of a fire hose. Auxiliary pumps have been employed in this regard but require isolation of the source of water and the pump to test the fire hose. Any leakage of water or volumetric increase of the fire hose requires reconnection of the source of water to the auxiliary pump and then further isolation of the same. Such apparatuses are, evidently, time consuming and labor intensive.

A pressure testing apparatus which automatically maintains constant pressure in a fire hose with a single connection to a source of water would be a notable advance in the fire fighting equipment field.

SUMMARY OF THE INVENTION

In accordance with the present invention of novel and useful pressure testing apparatus for one or more fire hoses is provided.

The pressure testing apparatus of the present invention utilizes a source of water under relatively low pressure and relatively high volumetric flow. For example, water found in municipal water system would suffice in this regard.

The apparatus includes a manifold having an inlet connected to the water source. At least one hose filling valve is also connected to the manifold. Of course, a multiplicity of hose filling valves may be spaced along the manifold for use in testing a multiplicity of fire hoses. The manifold may also be provided with a high speed water discharge valve which is useful in cleaning items. The manifold may be constructed of angular shaped conduit and formed such that a notch or bend appears along the conduit body.

The apparatus is also formed with pump means having a low pressure inlet in a high pressure outlet. The source of water further communicates with the low pressure pump means inlet. The high pressure outlet of the pump means communicates with the manifold to force water into the manifold at a relatively high pressure and a low volumetric flow rate. The pump means may be positioned on a base or fastened in other ways to the manifold such that a portion of the pump extends into the notch or bend of the manifold, heretofore described.

A regulator or pressure reducing valve is positioned in the manifold to determine the pressure of the water in the same. First and second check valves interpose the communication of the source of water and the manifold, and the pump means outlet and the manifold, respectively. In other words, back flow of high pressure water to the source of water and the pump means high pressure outlet is stopped by the first and second check valves. A meter is also provided to indicate the pressure within the manifold created by the regulator valve. Thus, once the source of water communicates with the manifold, the pump means is activated and the regulator valve is adjusted. Water may be permitted to flow into the fire hoses connected to the fire hose filling valve or valves, without further adjustment of the apparatus of the present invention. Of course, air must be purged from the fire hoses during this process.

It may be apparent that a novel and useful pressure testing apparatus for fire hoses has been described.

It is therefore an object of the present invention to provide a pressure testing apparatus which may be operated easily and quickly to automatically provide high pressure water into at least one fire hose without further disconnecting and reconnecting the apparatus to a source of water.

It is another object of the present invention to provide a pressure testing apparatus which saves excessive wear and tear on pumper trucks ordinarily used by fire fighting teams.

A further object of the present invention is to provide a pressure testing apparatus for fire hoses which does not employ fire fighting equipment, thus freeing such equipment to fight fires while testing of the hoses takes place.

Another object of the present invention is to provide a pressure testing apparatus for fire hoses which is also employable to clean fire fighting equipment.

Yet another object of the present invention is to provide a pressure testing apparatus for fire hoses which is easily transportable and compactly constructed, while permitting ample access for maintenance and repair of the same.

The invention possesses other objects and advantages especially as concerns particular characteristics and features thereof which will become apparent as the specification continues.

For a better understanding of the invention reference is made to the following detailed description of the preferred embodiments which should be referenced hereinabove described drawings.

DESCRIPTION OF THE PREFERRED EMBODIMENTS

Various aspects of the present invention will evolve from the following detailed description of the preferred embodiments which should be used in conjunction with the prior described drawings.

Figure 2:
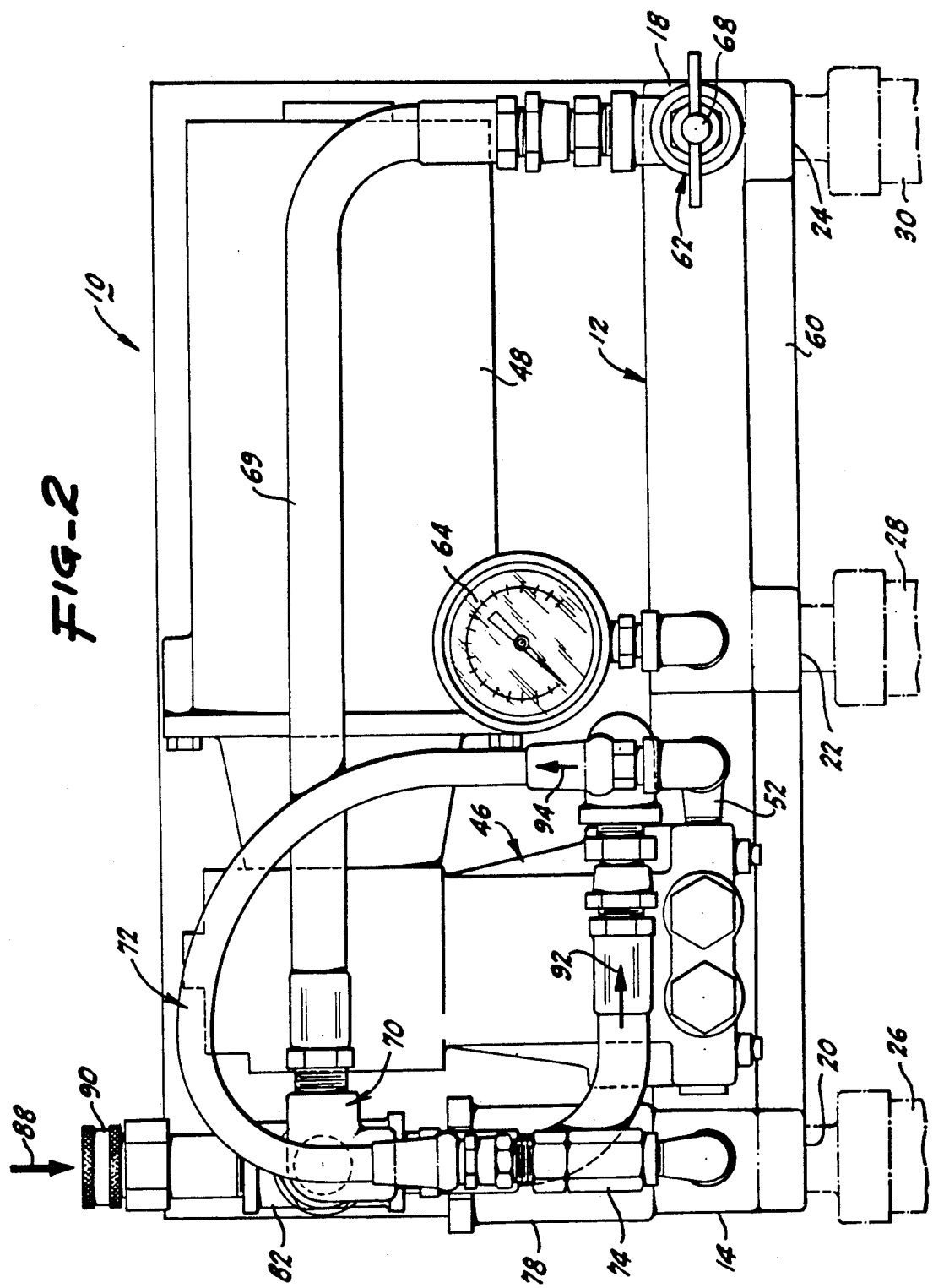
FIG. 2 is a top plan view of the apparatus of the present invention taken along line 2—2 of FIG. 1.

The invention as a whole is shown in the drawings by reference character 10. The pressure testing apparatus 10 includes as one of its elements a manifold 12 which is depicted as being constructed of "square" or angular conduit. Manifold 12 may be constructed of metal or similar material capable of holding relatively high pressure, typically at or about 750 pounds per square inch. Manifold 12 includes an inlet portion 14, a distribution portion 16, and a outlet portion 18, FIGS. and 2. With reference to FIG. it may be seen that manifold 12 forms a U-shaped notch 19 between hose filling outlets 20 and 22. Hose filling outlet 24 is also illustrated in FIG. 2. Thus, the apparatus is depicted in the drawings is capable of testing three fire hoses simultaneously.

Figure 4:
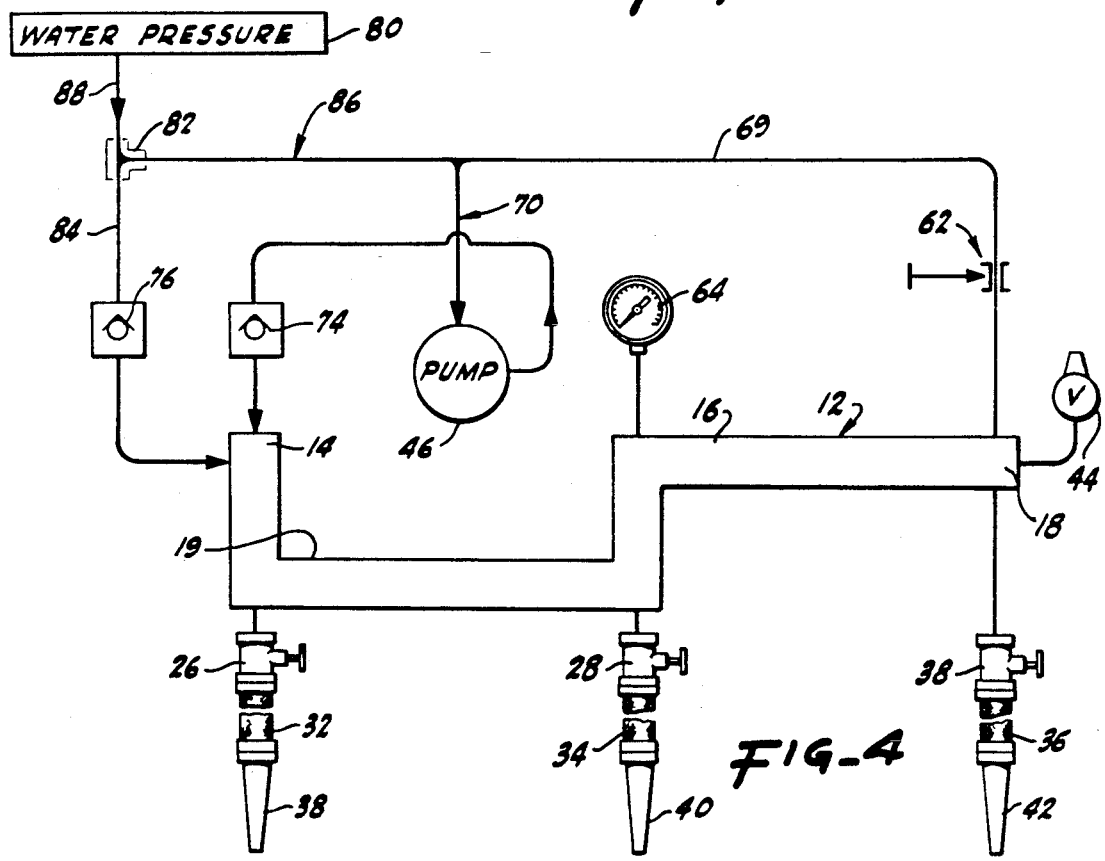
FIG. 4 is a generally schematic view of the apparatus of the present invention employing a multiplicity of hose filling valves.

FIG. 2 and FIG. 4 depict filling valves 26, 28, and 30 connected to fire hoses 32, 34, and 36, respectively. Nozzles 38, 40 and 42 connect to the end of hoses 32, 34, and 36, respectively. Of course, nozzles 38, 40, and 42 may be open by twisting in the conventional manner. Valves 26, 28, and 30 are capable of permitting the filling of noses 32, 34, and 36 at relatively high volume and, which will be described in greater detail as the specification continues. High pressure valve 44 includes an orifice which is capable of discharging water at high pressure from manifold 12 for cleaning or other purposes, aside from filling of fire hoses 32, 34, and 36.

Figure 1:
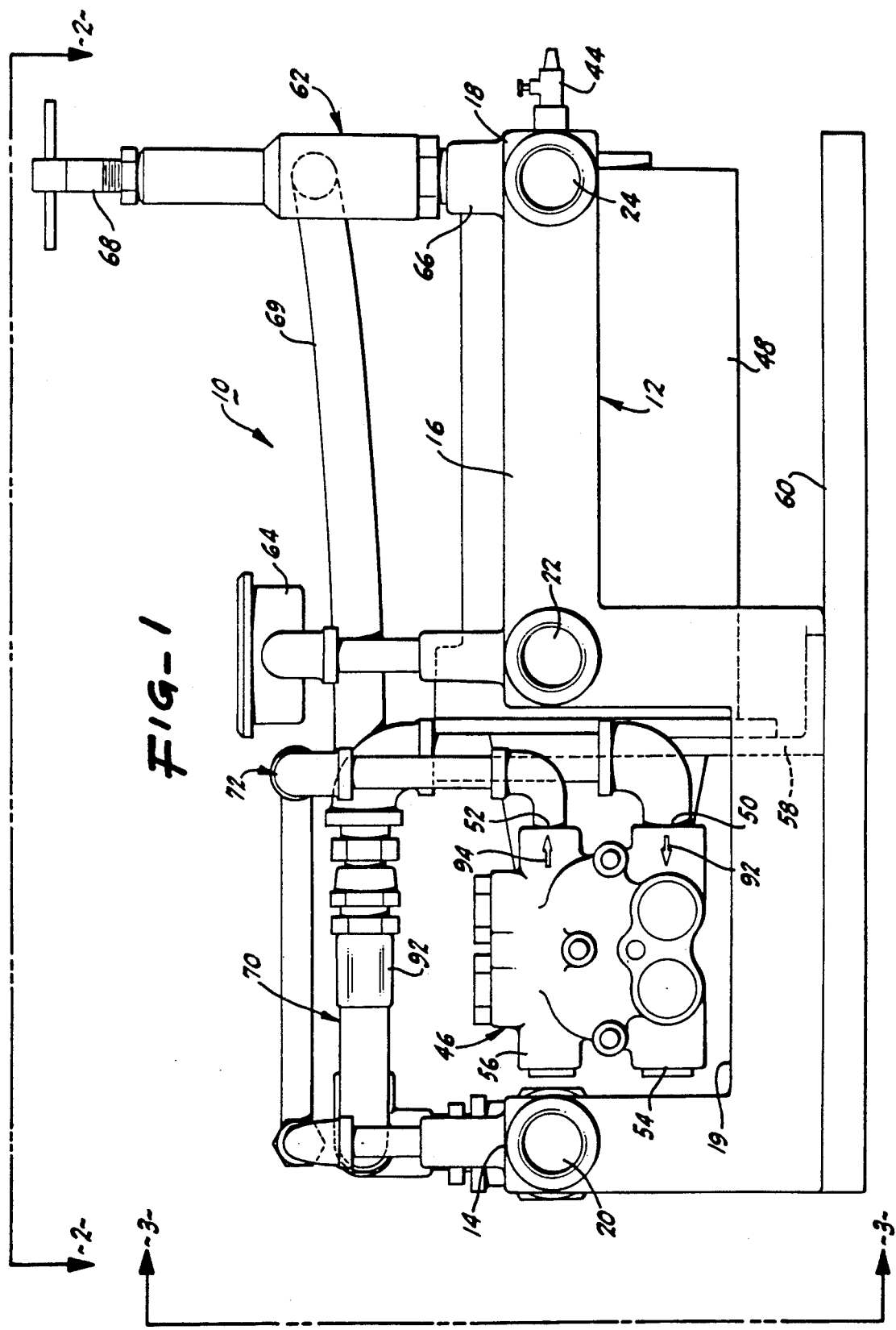
FIG. 1 is a front elevational view of the apparatus of the present invention.

Pump means 46 is also depicted in the drawings as an element of apparatus 10. Pump means 46 may be a positive displacement plunger pump, Model No. 8621, 2 GPM, having a maximum pressure of 1500 PSI, such as one manufactured by Hypro Corp. of New Brighton, Minn. Pump means 46 is operated by motor 48 which may be a one H.P., 3400 RPM motor such as one manufactured by Dayton Electric Manufacturing Co. of Chicago Ill. As best depicted in FIG. 1, pump means 46 includes a low pressure inlet 50 and a high pressure outlet 52. Plurality of inlets 54 and plurality outlets 56 may also be employed with pump means 46, but are depicted as being plugged or sealed in the present embodiment. Pump means 46 and motor 48 fasten to L-shaped bracket 58 which is welded or otherwise connected to base member 60. Pump means 46 extends within notch 19 of manifold 12, FIG. 2, to provide a relatively compact apparatus 10. Manifold 12 may also be fixed to platform 60 by welding or other fixing means. Manifold 12 may also be fixed to platform 60 by welding or other fixing means. Base member 60 may be formed of any rigid or semi-rigid material such as metal.

Apparatus 10 is constructed with a regulator or pressure reducing valve 62. Valve 62 is essentially placed at the outlet 18 of manifold 12 at the boundary between the high and low pressure portions of apparatus 10. Gage 64 indicates the pressure within manifold 12 as a result of a restriction to flow applied by valve 62. As depicted in the drawings, valve 62 sits atop nipple 66 at outlet 18 of manifold 12. The stem 68 permits the manual adjustment of valve 62 in this regard. Conduit 6969 on the low pressure side of valve 62 connects to low pressure fitting 70 which feeds inlet 50 of pump means 46.

Figure 3:
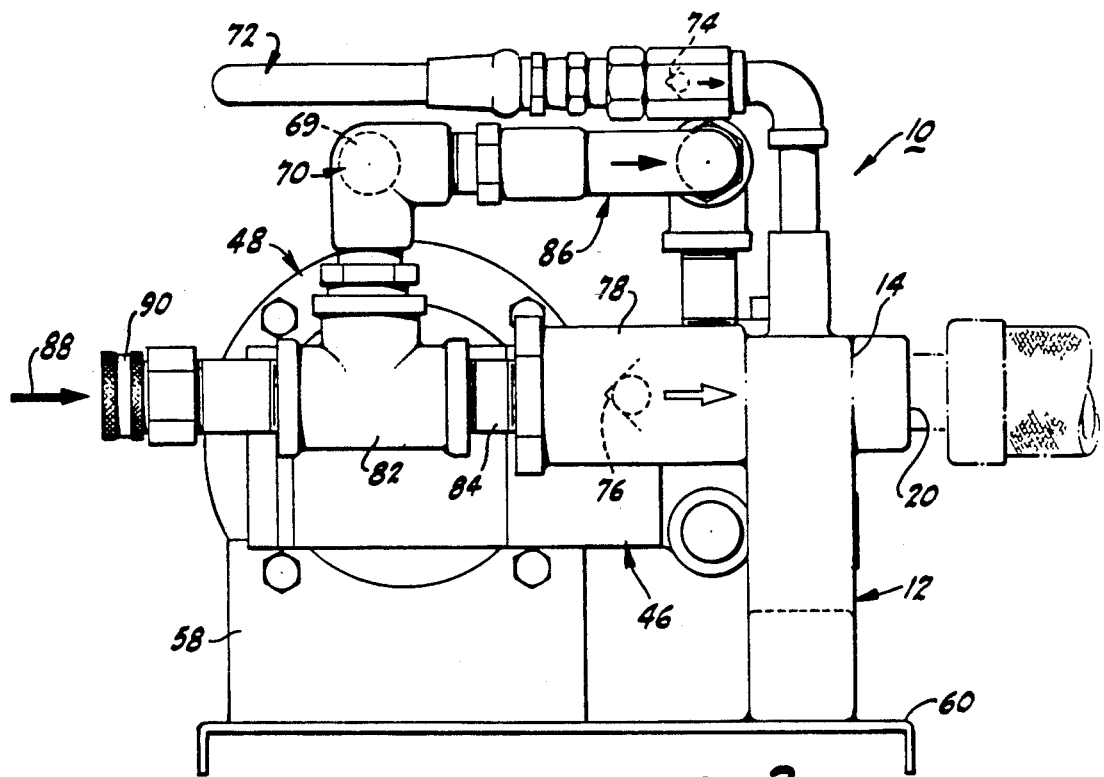
FIG. 3 is a left side view of the apparatus of the present invention taken along line 3—3 of FIG. 1.

High pressure outlet fitting 72 from pump means 46 leads to inlet 14 of manifold 12. A check valve 74 biases water flow from pump 74 into manifold 12. Also, check valve 76, found within housing 78 biases the flow of low pressure water from source 80 toward inlet 14 of manifold 12. First and second check valves 74 and 76 also lie at the boundary between high pressure manifold 12 and the low pressure portion of apparatus 10. Tee fitting 82 permits water to flow either into manifold 12 through conduit 84 and valve housing 78, or into pump means 46 through low pressure inlet fittings 86. Directional arrow 88, FIGS. 2, 3 and 4, depicts the flow of water from source 80, which may be a typical municipal water system having a high volume metric flow rate and a relatively low pressure (about 100 PSI).

In operation, the user connects inlet fittings 70 to pump 46 by the use of coupling 90. Water then will flow into apparatus 10 from source 80 via directional arrow 88. Of course, a valving arrangement at source 80 is used for this purpose (not shown). At this point valves 26, 28, 30 and 44 would be open to purge air from apparatus 10. Motor 48 and pump means 46 are then started and allowed to run for several seconds. Outlet valves 26, 28, 30, and 44 are then closed. Valve 62 is then adjusted to regulate the desired pressure in the hoses 32, 34, and 36 which are to be tested. Fire hoses 32, 34 and 36 are then connected to manifold 12 as depicted in FIG. 4. At this point, water would flow through pump means 46, enter inlet 50 per directional arrow 92, and exit from outlet 52 of pump means 46 via directional arrow 94. Fill valves 26, 28, and 30 are then opened to permit filling of hoses 32, 34, and 36. Water then flows from source 80 at relatively high volume to fire hoses 32, 34, and 36. Nozzles 38, 40, and 42 are open during this process to allow air to escape from fire hoses 32, 34, and 36. After the filling process, pump means 46 automatically goes into a recycle mode. Water is diverted back through pump means 46 and continues to recycle until motor 48 is turned off or another valve leading to manifold 12 is opened. Communication with source 80 need not be shut off during the recycle mode. Pump means 46 may remain on for several minutes, but this is not necessary since any leakage in hoses 32, 34, and 36 may be observed without further pumping.

While in the foregoing embodiments of the invention have been set forth in considerable detail for the purposes of making a complete disclosure of the invention it may be apparent to those of skill in the art that numerous changes may be made in such details without departing from the spirit and principles of the invention.

What is claimed is:

1. A pressure testing apparatus for at least one fire hose utilizing a source of water under relatively low pressure and relatively high volume comprising:

a. a manifold including at least one hose filling valve, the source of water communicating with said manifold through a source conduit to fill the same;

b. pump means having a low pressure inlet and a high pressure outlet, the source of water further communicating with said pump means low pressure inlet, said high pressure outlet of said pump communicating with said manifold through pump means outlet conduit to force water into said manifold at a relatively high pressure and at a low volume;

c. a throttling regulator valve positioned in said manifold to determine the pressure of the water in said manifold;

d. a return conduit connecting said throttling regulator valve to said pump means, said return conduit operating at a low pressure relative to said pressure in said manifold;

e. a first check valve placed in said source conduit between said manifold and the source of water, said first check valve preventing high pressure flow of water from said manifold to the source of water;

f. a second check valve placed in said pump means outlet conduit interposed said connection of said manifold to said pump means outlet, said second check valve preventing high pressure flow of water from said manifold to said pump means outlet; and g. at least one filler valve for passing water from said manifold to the at least one fire hose.

2. The pressure testing apparatus of claim 1 in which said manifold is constructed of conduit forming a notch, said pump means occupying at least a portion of said notch.

3. The pressure testing apparatus of claim 2 in which said manifold includes an outlet for high speed discharge of water from said manifold.

4. The pressure testing apparatus of claim 2 in which said manifold includes angular shaped conduit.

5. The pressure testing apparatus of claim 1 in which said manifold includes a high pressure portion, said regulator valve, first check valve, and second check valve determining the integrity of said high pressure portion of said manifold.

6. A pressure testing apparatus for a plurality of five hoses utilizing a source of water under relatively low pressure and relatively high volume comprising:

a. a manifold including a plurality of hose filling valves, the source of water communicating with said manifold through a source conduit to fill the same, said manifold being constructed of conduit forming a notch;

b. pump means having a low pressure inlet and a high pressure outlet, the source of water further communicating with said pump means low pressure inlet, said high pressure outlet of said pump communicating with said manifold through a pump outlet conduit to force water into said manifold at a relatively high pressure and at a low volume, said pump means occupying said notch in said manifold; and c. a plurality of filler valves for passing water from said manifold to the plurality of fire hoses.

* * * * *